United States Patent [19]

Yokobori et al.

[11] 4,344,023
[45] Aug. 10, 1982

[54] DRIVE SYSTEM FOR A BRUSHLESS DC MOTOR

[75] Inventors: Nobuyoshi Yokobori, Osaka; Yoshiaki Igarashi, Ikoma; Tetsuo Maeda, Neyagawa, all of Japan

[73] Assignee: Matsushita Electric Industrial Co., Ltd., Kadoma, Japan

[21] Appl. No.: 208,477

[22] Filed: Nov. 19, 1980

[30] Foreign Application Priority Data

Nov. 24, 1979 [JP] Japan ................................. 54-152325

[51] Int. Cl.³ .......................................... H02K 29/00
[52] U.S. Cl. ................................. 318/254; 318/138
[58] Field of Search ................ 318/254 A, 254, 138

[56] References Cited

U.S. PATENT DOCUMENTS 3,757,185 9/1973 Brunner et al. .................. 318/254
3,938,014 2/1976 Nakajima ........................ 318/138
4,039,911 8/1977 Tanikoshi ........................ 318/254

Primary Examiner—Gene Z. Rubinson
Assistant Examiner—S. M. Bergmann
Attorney, Agent, or Firm—Wenderoth, Lind & Ponack

[57] ABSTRACT

A drive system for a brushless dc motor to control the magnitude of the torque of a motor which has permanent magnet rotor and Hall generators. Multipliers determine the magnitude of current to each phase armature winding so as to determine the current sharing rate among the armature windings according to the rotation angle of the rotor, whereby degrading of torque uniformity due to variation of Hall generator characteristics is avoided. Each multiplier multiplies 2 signals, one being the output of the Hall generator, the other being the difference between the torque control input and the fed back signal of total armature current. Also a torque direction input is supplied to each multiplier to determine the direction of the rotational torque.

6 Claims, 8 Drawing Figures and 4,344,023

DRIVE SYSTEM FOR A BRUSHLESS DC MOTOR

BACKGROUND OF THE INVENTION

This invention relates to a drive system for a brushless dc motor, and more particularly to a drive system which avoids the degrading of torque uniformity due to variation of Hall generator characteristics when used as rotor position sensors.

In prior engineering, there are two types of driving system for driving brushless dc motors having Hall generators as position sensors. One of these is a voltage control type and the other is a current control type. In the voltage control type, voltage across one armature winding is controlled so as to be proportional to the corresponding Hall generator output. The magnitude and the direction of torque is controlled by the current applied to the Hall generators. Torque is approximately proportional to the voltage across armature winding when the BEMF (back electromotive force) due to the rotation is small enough to make the armature voltage approximately proportional to the armature current. However when the output voltages of Hall generators differ from each other due to variations of Hall generator characteristics (with equal magnitudes of applied currents), torque uniformity is degraded because the magnitude of armature current differs in each phase winding.

Under the current type control, Hall generators are used to select the armature winding to be supplied with current according to the rotation of the rotor. Armature current directly proportional to torque is controlled so as to generate an adequate torque. Since the wave form of an armature winding is not sinusoidal but square, longitudinal force is generated and causes undesirable vibration and non-uniformity of torque in the case of a flat type motor where rotor magnet and the armature windings are faced to form an axial air gap. Besides, torque uniformity is degraded by the phase shift of current switching to select the armature winding caused by the variation of the output voltage among Hall generators.

A significant disadvantage of the conventional system mentioned above is the requirement either of means to adjust the output voltage of Hall generators or of selection of the Hall generators in order to improve the non-uniformity of torque.

OBJECT OF THE INVENTION

Therefore it is an object of the present invention to provide a drive system for a brushless dc motor which avoids the above mentioned disadvantage of prior art.

It is another object of this invention to provide a drive system having a total armature current detector and an error amplifier to make the total armature current proportional to the torque control input at every instant.

It is another object of this invention to provide a drive system having multipliers to determine the magnitude and the sharing rate of armature currents among each phase winding.

It is another object of this invention to provide a drive system having multipliers which accept a torque direction input to determine the direction of rotational torque.

SUMMARY OF THE INVENTION

In accordance with the present invention, a drive system for a brushless dc motor is provided to drive a brushless dc motor having Hall generators as rotor position sensors. The output signal of each Hall generator is applied to the corresponding multiplier. Total armature current is detected by a current detector and fed back to the error amplifier, where it is compared with the torque control input to produce an error signal. The error signal and the output of the Hall generator are multiplied by the multiplier to determine the magnitude and sharing rate of armature current of each phase winding. The output of the multiplier is applied to the driver amplifier to drive the armature winding of the corresponding phase; this provides a drive system which avoids the degrading of torque uniformity and undesirable longitudinal vibration even when the output voltage variation of the Hall generator is not eliminated by adjustment or selection.

BRIEF DESCRIPTION OF THE DRAWINGS

These and other objects and features of the present invention will become apparent from consideration of the following detailed description of the invention taken together with accompanying drawings, in which.

DETAILED DESCRIPTION OF A PREFERRED EMBODIMENT

Figure 1:
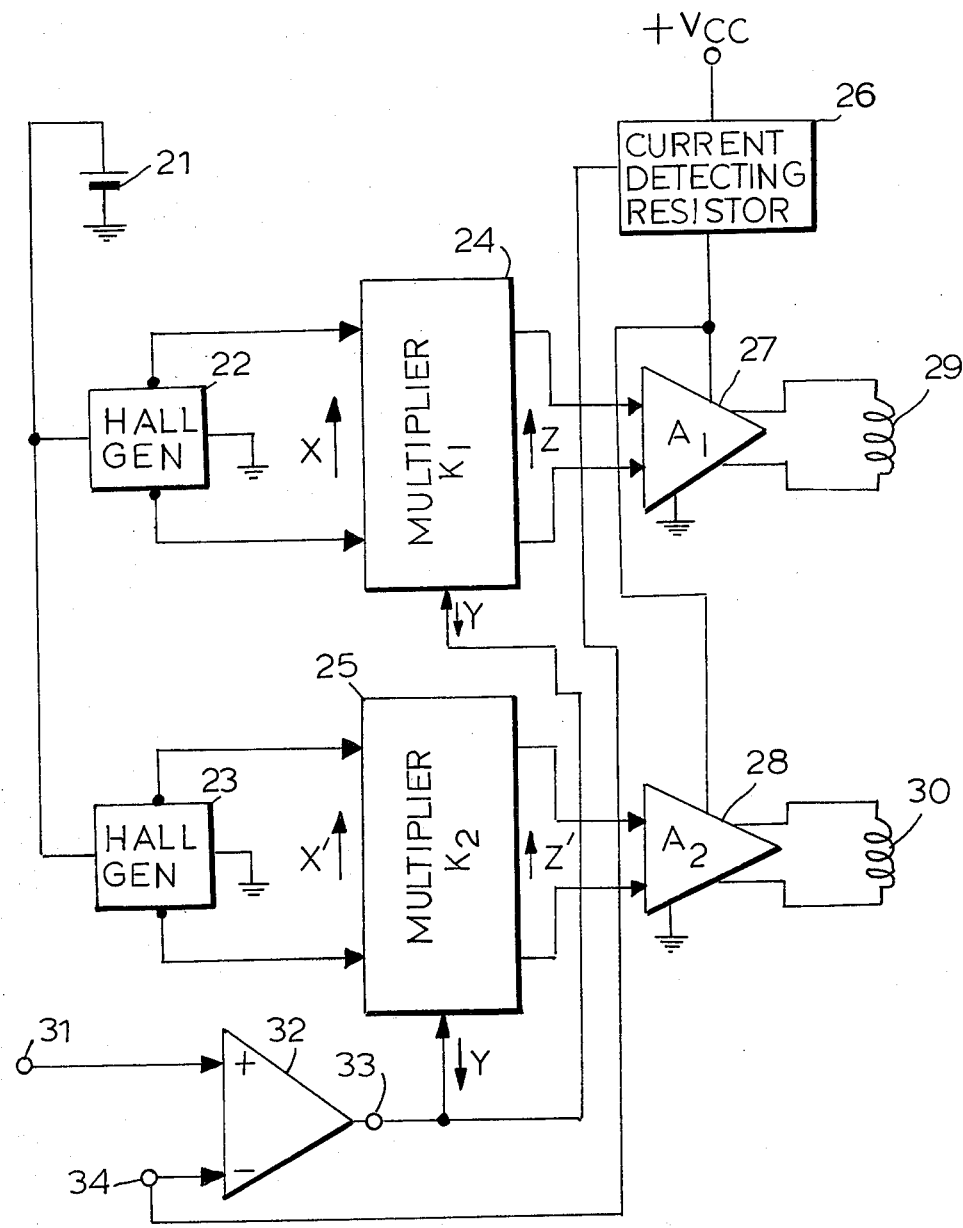
FIG. 1 is a schematic diagram of a preferred embodiment of the invention.

FIG. 1 is a schematic diagram of a preferred embodiment of the invention. Referring to FIG. 1, two Hall generators 22, 23, electrically displaced by 90°, are connected in parallel and are supplied with a certain current by a dc voltage source 21 so as to sense the rotor position and generate position signals. The outputs of the Hall generators 22, 23, corresponding to the rotor position are applied to the differential input of the two multipliers 24, 25, respectively. These inputs accept voltage as input signal. The other inputs of multipliers 24, 25 accept current. The outputs of multipliers 24, 25 are applied to two driver amplifiers 27, 28 to amplify and apply armature currents and hence drive two armature windings 29, 30 which are electrically displaced by 90°, respectively. The sum total of the absolute values of the current through the armature windings 29, 30 is converted to voltage by a current detecting resistor 26 and is applied to one of the differential inputs, 34, of an error amplifier 32, whereby a negative feed back loop is formed. A torque control input signal is applied to the other input 31 of the error amplifier 32 whose output 33 is applied to the current inputs of the multipliers 24, 25 in parallel.

Figure 2:
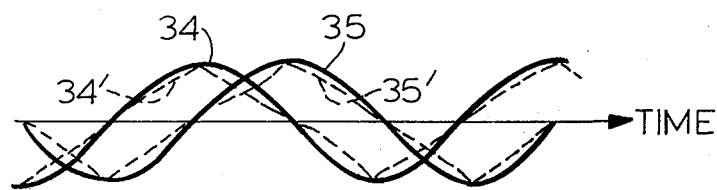
FIG. 2 is output wave form diagrams of the Hall generator and the multiplier.

When output voltage of the two Hall generators are equal as shown in FIG. 2, wave forms of input voltages X and X' of the multipliers 24, 25 referenced to time are sine and cosine, respectively, 34, 35, of the same amplitude. Armature current through the armature windings 29, 30 under this condition changes automatically so as to keep the sum of the absolute value of each current constant. That is, an output current Y of the error amplifier 32 changes in accordance with the voltage X and X' to keep the armature current constant by making the output Z, Z' of the multipliers 24, 25 become wave forms 34', 35', respectively.

Figure 3:
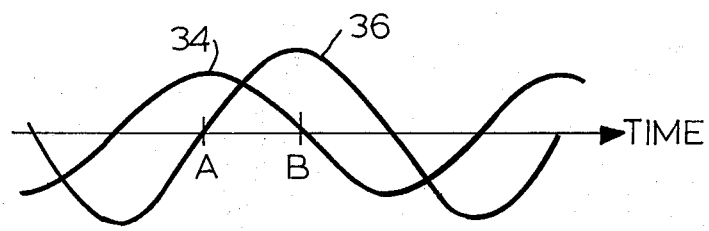
FIG. 3 is output wave form diagram of Hall generators with different output voltages.
Figure 4:
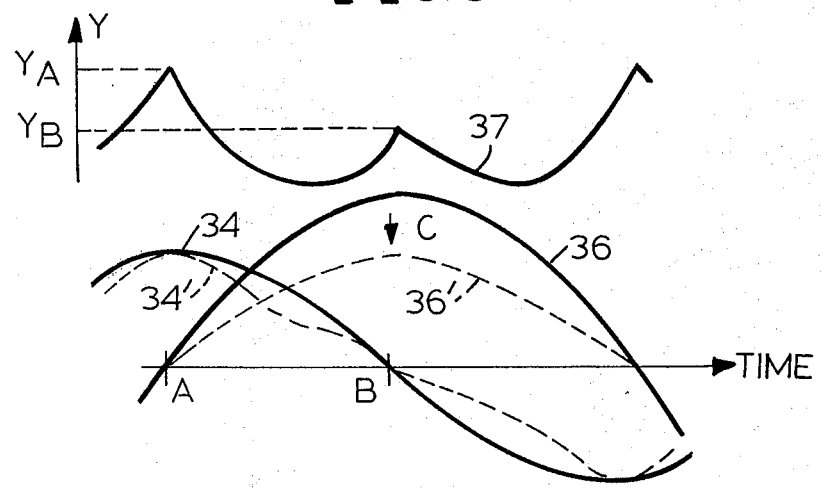
FIG. 4 is a diagram to explain the operation of the circuit shown in FIG. 1.

Next, an effective case of the present invention is explained referring to FIG. 3 and FIG. 4.

The output voltage of the Hall generator 23 is supposed to be larger than that of the other Hall generator 22. Wave forms of input voltages X and X' of the multipliers 24, 25 are shown in FIG. 3 as 34 and 36, respectively. As X'=0 at the instant A, Z' becomes zero, hence only the armature current of the armature winding 29 is detected by the current detector 26 and controlled to be a certain magnitude. If the torque generated by this magnitude of current is assumed to be a desired one, a torque generated by the magnitude of current only of the armature winding 30 at the instant B when X=0 is too large without the effect of the present invention.

The wave form of the period from A to B in FIG. 3 is enlarged and shown in FIG. 4.

In FIG. 4, let the output value of the error amplifier 32 be $Y_A$ at the instant A and $Y_B$ at the instant B. At each instant A and B, Z and Z' are expressed as follows:

$$Z = K_1 \cdot X \cdot Y_A$$

$$Z' = K_2 \cdot X' \cdot Y_B$$

(where $K_1$, $K_2$: Gain constant of multipliers 24, 25, respectively)

If it is further supposed that gain constants of amplifiers 27 and 28 are $A_1$ and $A_2$, that dc resistance of armature windings 29 and 30 are $R_1$, $R_2$, that armature current of armature windings 29 and 30 are $I_1$, $I_2$, respectively, and that the gain of the error amplifier is large enough, $I_1$ and $I_2$ become: at the instant A;

$$I_1 = (1/R_1) \cdot A_1 \cdot K_1 \cdot X \cdot Y_A$$

and at the instant B;

$$I_2 = (1/R_2) \cdot A_2 \cdot K_2 \cdot X' \cdot Y_B.$$

These currents $I_1$ and $I_2$ are controlled to be equal to the desired value I by the negative feed back loop of the error amplifier 32, so that:

$$Y_A = (R_1/A_1 \cdot K_1 \cdot X) \cdot I \text{ (where } X > 0 \text{ and } X' = 0\text{)}$$

and
$$Y_B = (R_2/A_2 \cdot K_2 \cdot X') \cdot I \text{ (where } X = 0 \text{ and } X' > 0\text{)}.$$

At times between A and B, output value Y of the error amplifier 32 becomes:

$$Y = \frac{I}{\frac{A_1 \cdot K_1 \cdot X}{R_1} + \frac{A_2 \cdot K_2 \cdot X'}{R_2}} \text{ (where } X > 0, X' > 0 \text{ and } X + X' \neq 0\text{)}$$

If $(A_1 \cdot K_1/R_1) = (A_2 \cdot K_2/R_2)$, the current sharing rate $I_1/I_2$ among the armature windings 29, 30 becomes:

$$I_1/I_2 = X/X'$$

which is apparently determined by the output of the Hall generators.

While, the total current $(I_1 + I_2)$ becomes, $$I_1 + I_2 = \frac{A_1 K_1 X}{R_1} \cdot Y + \frac{A_2 K_2 X'}{R_2} \cdot Y$$
$$= I$$

which is the desired value.

In general, Y is expressed as:

$$Y = \frac{I}{\frac{A_1 \cdot K_1 \cdot |X|}{R_1} + \frac{A_2 \cdot K_2 \cdot |X'|}{R_2}} \text{ (where } |X| + |X'| \neq 0\text{)}$$

which is shown as a wave form 37 in FIG. 4.

Consequently, the armature currents $I_1$ and $I_2$ become 34' and 36', respectively, and the sum of $I_1$ and $I_2$ to determine the magnitude of the generated torque becomes I which is controlled to be a desired value by the torque control input. And the current sharing rate is determined by the ratio of the position signals X/X' through the operation of multipliers.

The difference of the output voltage X, X' due to the Hall generator characteristics is automatically eliminated in the armature current by the feed back loop.

Figure 5:
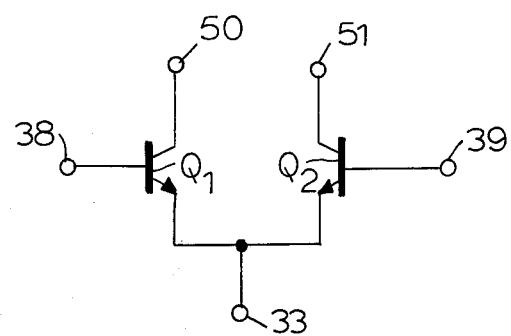
FIG. 5, FIG. 6 and FIG. 7 are schematic diagrams of multipliers.

FIG. 5 illustrates a preferred example of a multiplier used in the embodiment of this invention. NPN transistors $Q_1$ and $Q_2$ constitute an emitter-coupled variable transconductance (gm) multiplier to produce a product of the input voltage at the differential input terminals 38, 39 and the input current at the common emitter 33 to differential output terminals 50, 51 as the difference of collector currents, thereof.

Figure 6:
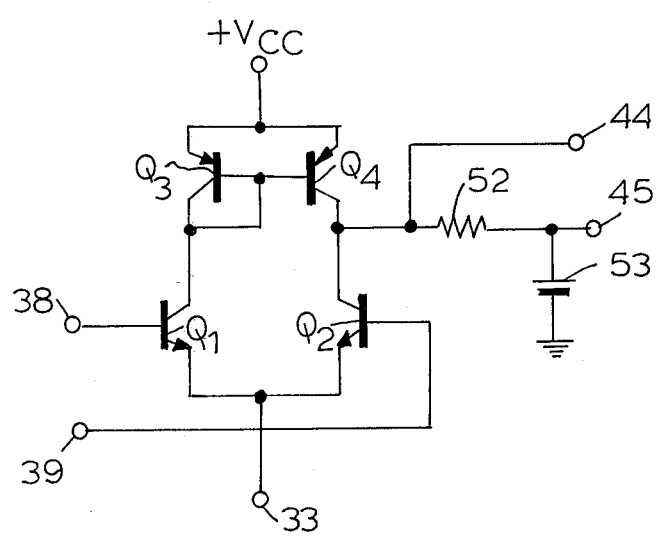

FIG. 6 illustrates an example of a multiplier with a differential voltage output. A current mirror consisting of PNP transistors $Q_3$ and $Q_4$ is connected as an active load of the NPN emitter-coupled transistors $Q_1$, $Q_2$ in order to mirror the collector current of $Q_1$. Collectors of $Q_2$ and $Q_4$ are connected together to provide a current which is the difference between the collector currents of $Q_1$ and $Q_2$ to a resistor 52 connected between the connected point of the collectors of $Q_2$ and $Q_4$ and a dc voltage source 53. A differential output terminals 44 and 45 is connected to the resistor 52 as in FIG. 6. A voltage proportional to the product of the input voltage at the differential input terminals 38 and 39 and the input current at the common emitter 33 of $Q_1$ and $Q_2$ appears across the resistor. The voltage source 53 is to supply a dc voltage to the output terminal 45 for an appropriate operation.

Figure 7:
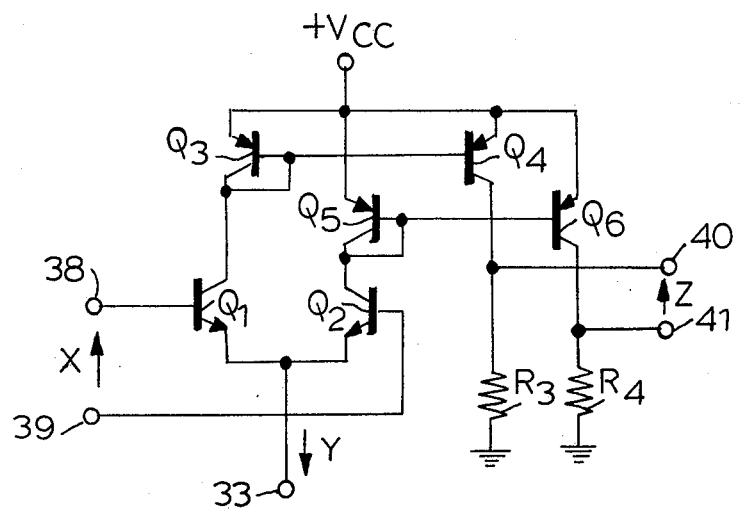

FIG. 7 illustrates another example of a multiplier used in the preffered embodiment. Two current mirrors consisting of PNP transistors $Q_3$, $Q_4$ and $Q_5$, $Q_6$ are added to the circuit of FIG. 5 in such a manner that the collector current of $Q_1$ is mirrored by $Q_3$, $Q_4$ to produce a voltage across a resistor $R_3$ connected between the collector of $Q_4$ and a signal ground, and the collector current of $Q_2$ is mirrored by $Q_5$, $Q_6$ to produce a voltage across a resistor $R_4$ connected between the collector of $Q_6$ and the signal ground.

The differential output terminal's terminals 40, 41 are connected to the collectors of $Q_4$, $Q_6$, respectively. In this circuit, an output voltage Z proportional to the product of the input signals appears at the differential output terminals 40, 41. Hence, Z is:

$$Z = K \cdot X \cdot Y$$

where
- $K \equiv (q/kT) \cdot R$
- q: electron charge
- k: Boltzmann constant
- T: Temperature (°K.)
- $R = R_3 = R_4$
- X: differential input voltage between 38, 39
- Y: current at the common emitter 33

Figure 8:
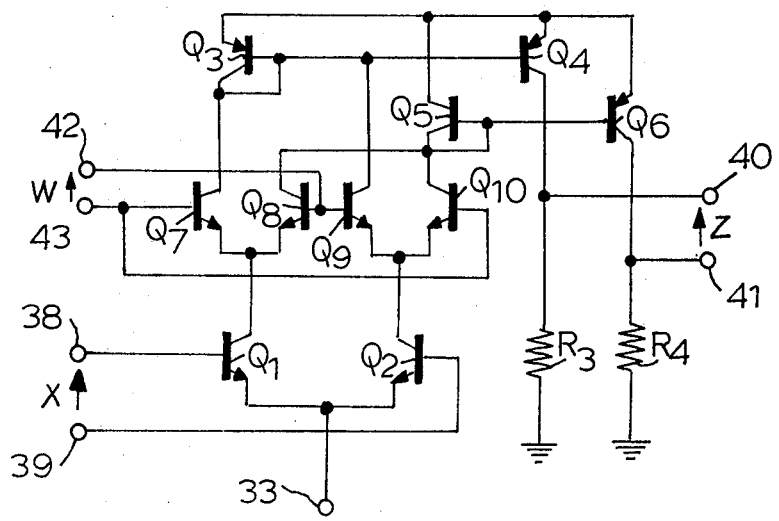
FIG. 8 is a schematic diagram of a multiplier with 3 inputs of a preferred embodiment of the invention.

FIG. 8 illustrates another example of the multiplier with a further input for torque direction control. Two pairs of emitter-coupled NPN transistors $Q_7$, $Q_8$ and $Q_9$, $Q_{10}$ are added to the circuit of FIG. 7 in the following manner:

$Q_7$ is inserted between the collectors of $Q_1$ and $Q_3$, a common emitter of $Q_7$ and $Q_8$ being connected to the collector of $Q_1$ and the collector of $Q_7$ being connected to the collector of $Q_3$;

$Q_{10}$ is inserted between the collectors of $Q_2$ and $Q_5$, a common emitter of $Q_9$ and $Q_{10}$ being connected to the collector of $Q_2$ and the collector of $Q_{10}$ being connected to the collector of $Q_5$;

a collector of $Q_8$ is connected to the collector of $Q_5$;

bases of $Q_7$ and $Q_{10}$ are connected together to constitute an input terminal 43; and bases of $Q_8$ and $Q_9$ are connected together to constitute an input terminal 42.

If a torque direction input W is applied differentially to the input terminals 42, 43 as shown in FIG. 8 collector currents of $Q_1$ and $Q_2$ are steered by $Q_7 \sim Q_{10}$ according to the polarity of input W, so that the output Z is:

$$Z = K \cdot W \cdot X \cdot Y$$

If W is large enough to switch the transistors $Q_7 \sim Q_{10}$, $|Z|$ is proportional to the product of X and Y. Hence, the direction of armature currents is controlled by the polarity of W, that is, the direction of rotating torque is determined by the torque direction input W.

While in FIGS. 5 to 8, $Q_1$, $Q_2$ and $Q_7 \sim Q_{10}$ are NPN transistors and $Q_3 \sim Q_6$ are PNP transistors, $Q_3 \sim Q_6$ can be eliminated if PNP transistors are used for $Q_1$, $Q_2$ and $Q_7 \sim Q_{10}$.

Besides, even if the input terminals for X and W are exchanged, the same operation will result. As described hereinbefore, the present invention provides a drive system for a brushless dc motor automatically eliminating defects due to the variation of Hall generator characteristics by means of multipliers and a current detector; whereby it avoids the disadvantage of required adjustment or selection of Hall generators.

While the invention has been shown and described with reference to a particular embodiment thereof, it should be readily apparent to those skilled in the art that various changes and modification may be made within the scope of the invention.

What is claimed is:

1. A drive system for a brushless dc motor, comprising:

first and second generator means electrically displaced by 90° for generating position signals in differential mode by sensing an angular position of a permanent magnet rotor of said motor in such a manner that said position signals vary sinusoidally with respect to the position of said rotor;

first multiplier means having a first input terminal differentially coupled to said first generator means and a second input terminal for multiplying said position signal of said first generator means and a signal applied to said second input terminal thereof;

second multiplier means having a first input terminal differentially coupled to said second generator means and a second input terminal for multiplying said position signal of said second generator means and a signal applied to said second input terminal thereof;

a first driver amplifier for amplifying an output signal of said first multiplier means and applying an armature current to a first armature winding of said motor;

a second driver amplifier for amplifying an output signal of said second multiplier means and applying an armature current to a second armature winding of said motor;

current detector means for detecting a sum total of an absolute value of said armature current of said first and second armature windings; and error amplifier means for amplifying the difference between an output signal of said current detector means and a torque control input, said error amplifier means being coupled to said second input terminals of said first and second multiplier means in parallel, whereby the magnitude of said armature current in total is determined by said torque control input, and the sharing rate of said armature current in total among said first and second armature windings is determined by said first and second generator means in accordance with said position signals.

2. A drive system according to claim 1, wherein said first and second generators are Hall generators whose current terminals are connected in parallel so as to be supplied with an equal voltage.

3. A drive system according to claim 1, wherein each of said first and second multiplier means comprises: an emitter coupled transistor pair of the same polarity whose common emitter constitutes said second input terminal, and whose bases constitutes said first input terminal; and a differential output terminal connected to collectors of said transistor pair for multiplying two signals applied to said first and second terminals to output a product at said differential output terminal as a difference of current between collectors thereof.

4. A drive system according to claim 1, wherein each of said first and second multiplier means comprises:

first emitter coupled transister pair of first and second transistors of the same polarity whose common emitter constitutes said second input terminal, and whose bases constitute said first input terminal;

second emitter coupled transistor pair consisting of third and fourth transistors whose polarity is opposite to said polarity of said first transistor pair, whose common emitter is connected to a power supply means, whose bases are connected in common and further connected to a collector of said third transistor to constitute a current mirror, and each of whose collectors are connected to each of the collectors of said first transistor pair respectively;

a resistor means coupled to a collector of said fourth transistor and to a dc voltage supply means; and a differential output terminal coupled to said resistor means for multiplying two signals applied to said first and second input terminals to output a product at said differential output terminal as a difference of voltage across said resistor means.

5. A drive system according to claim 1, wherein each of said first and second multiplier means comprises:
- an emitter coupled transistor pair of first and second transistors of the same polarity whose common emitter constitutes said second input terminal, and whose bases constitute said first input terminal;
- first current mirror consisting of third and fourth transistors whose polarity is opposite to said first transistor pair; whose common connected emitter is connected to a power supply means; and whose common connected base is connected to a collector of said third transistor and to a collector of said first transistor;
- second current mirror consisting of fifth and sixth transistors whose polarity is opposite to said first transistor pair; whose common connected emitter is connected to a power supply means; and whose common connected base is connected to a collector of said fifth transistor and to a collector of said second transistor;
- first resistor means coupled to a collector of said fourth transistor and to a dc voltage supply means;
- second resistor means coupled to a collector of said sixth transistor and to said dc voltage supply means; and
- a differential output terminal with first and second output terminal connected to said collectors of said fourth and sixth transistors, respectively, for multiplying two signals applied to said first and second input terminal to output a product in voltage at said differential output.

6. A drive system according to claim 5, wherein each of said first and second multiplier means further comprises:
- another emitter coupled transistor pair of seventh and eighth transistors whose polarity is the same as said first and second transistors', inserted between said collectors of said first and third transistors in such a manner that a common emitter of said seventh and eighth transistors is connected to said collector of said first transistor, that a collector of said seventh transistor is connected to said collector of said third transistor and that a collector of said eighth transistor is connected to said collector of said fifth transistor;
- another emitter coupled transistor pair of ninth and tenth transistors whose polarity is the same as said first and second transistors', inserted between said collectors of said second and fifth transistors in such a manner that a common emitter of said ninth and tenth transistors is connected to said collector of said second transistor, that a collector of said tenth transistor is connected to said collector of said fifth transistor and that a collector of said ninth transistor is connected to said collector of said third transistor; and
- a third input terminal in differential mode with two terminals; one being connected to a base of said eighth transistor and to a base of said ninth transistor; the other being connected to a base of said seventh transistor and to a base of said tenth transistor, whereby a torque direction input is applied to one of said first and third input terminal to determine the sign of an output signal at said differential output terminal produced by a product of two signals applied to the other of said first and third input terminal and to said second input terminal for determining the magnitude and direction of torque of said motor.

* * * * *